United States Patent [19]

Hori et al.

[11] Patent Number: 5,006,395
[45] Date of Patent: Apr. 9, 1991

[54] IRON CARBIDE THIN FILM MAGNETIC RECORDING MEDIUM

[75] Inventors: Tohru Hori, Ikoma; Tomi Sato, Neyagawa; Hideaki Komoda; Kenichi Fujii, both of Hirakata, all of Japan

[73] Assignee: Matsushita Electric Industrial Co., Ltd., Osaka, Japan

[21] Appl. No.: 193,278

[22] Filed: May 11, 1988

[51] Int. Cl.$^5$ ............................................. G11B 23/00
[52] U.S. Cl. .................................... 428/141; 428/688; 428/694; 428/900; 204/192.14; 204/192.15; 204/192.2; 427/127; 427/131
[58] Field of Search ................................ 428/900, 694; 204/192.14, 192.15, 192.2

[56] References Cited

U.S. PATENT DOCUMENTS

| | | | |
|---|---|---|---|
| 3,494,738 | 2/1970 | Gray et al. | 23/208 |
| 3,572,993 | 3/1971 | Rogers | 23/208 |
| 4,587,178 | 5/1986 | Shimizu et al. | 428/615 |
| 4,632,866 | 12/1986 | Kubota et al. | 428/328 |
| 4,668,414 | 5/1987 | Okamura et al. | 252/62.51 |
| 4,668,647 | 5/1987 | Rice et al. | 502/5 |
| 4,732,761 | 3/1988 | Machida et al. | 437/228 |
| 4,786,564 | 11/1988 | Chen et al. | 428/694 |
| 4,794,042 | 12/1988 | Kubota et al. | 428/328 |
| 4,842,759 | 6/1989 | Okamura et al. | 252/62.51 |

FOREIGN PATENT DOCUMENTS 59-207426 11/1984 Japan.

OTHER PUBLICATIONS

J. Sol. State Chem. 54:54-60 (1984), D. Andriamandroso et al., "New Ferromagnetic Materials for Magnetic Recording: The Iron Carbonitrides".

Wireless Research Lab, Matsushita Electric, 5-7-87 K. Fujii et al., "Preparation of FE-C Thin Films by ECR Plasma CVD".

Jap. J. App. Physics 26:L28-L31, (1987), K. Watanabe et al., "Magnetic Fe-C Films Prepared by Getter Sputtering on High Temperature Substrates".

*Primary Examiner*—George F. Lesmes
*Assistant Examiner*—Stevan A. Resan
*Attorney, Agent, or Firm*—Wenderoth, Lind & Ponack

[57] ABSTRACT

A magnetic recording medium essentially composed of a substrate and a ferromagnetic thin film deposited on the surface of the substrate is provided herein. This ferromagnetic film is such as to have a minimum of 400 Öe of coercive force and composed mainly of an iron carbide. According to this construction, the magnetic characteristics are greatly improved.

5 Claims, 8 Drawing Sheets

IRON CARBIDE THIN FILM MAGNETIC RECORDING MEDIUM

BACKGROUND OF THE INVENTION

1. Field of the Invention

The present invention relates to a magnetic recording medium, and more particularly to a magnetic recording medium having a magnetic recording thin film and also to a method of and an apparatus for manufacturing it.

2. Description of the Prior Art

Magnetic recording media are widely used in the field of audio visual systems and the field of information processing systems. Recently, with the rapid progress of technologies in these fields, the recording media are required to be higher in recording density, higher in reliability and lower in cost.

Conventionally, a wide variety of magnetic materials are used in diversified forms such as tapes, discs, cards, etc., in which thin film made of magnetic iron oxide powder is mainly made available for constituting magnetic recording medium having significantly improved recording density. Nevertheless, since such thin film is not continuously formed but merely by dispersing iron oxide in resin, it is relatively low in recording density and the signal quality (i.e., signal to noise (S/N) ratio). To compensate for this, metallic film made of compound of cobalt, iron, and chrome is widely used for metallic video tapes or sputter type hard discs. On the other hand, although metallic thin film medium used for recording medium has better magnetic characteristic than that of oxidized materials, due to influence of atmospheric moisture and oxygen, it is gradually degraded via corrosion. As a result, in order to practically apply metallic film medium, manufacturer needs to improve resistivity of the film medium against corrosion by providing the film surface with coating of layers composed of organic materials or non-magnetic oxide like the one typically proposed by those prior arts including Japanese Patents Laid-Open Nos. 58-189827 (1983) and 62-293509 (1987) for example. Nevertheless, coating of those materials cited above disadvantageously results in the increased production stages and cost.

On the other hand, it is reported in those prior arts including Japanese Patents Laid-Open Nos. 60-25012 (1985) and 62-297437 (1987) for example that iron nitride and iron carbide are not only chemically stable, but both materials also proved to be comparable in magnetic characteristics to that of metallic material. Iron nitride and iron carbide are soft magnetic materials, having high saturation magnetization, and thus, those who are concerned positively follow up studies for effectively applying these to the production of head material.

Nevertheless, studies on the application of ferrous compounds to the magnetic recording medium are not yet fully expedited except for study on iron oxide such as iron carbide and iron nitride mentioned above, and yet, no preceding art has ever reported the development of iron carbide having capability of retaining sufficient magnetic force durable enough for practical application to recording medium.

Conventionally, in addition to plating process, "physical vapor deposition process" (hereinafter called PVD process) such as sputter process and vacuum evaporation process, etc. is mainly used for the production of magnetic compound thin film. Nevertheless, compared to "chemical vapor deposition process" (hereinafter called CVD process), since the energy of particles emitted from the mother material is low in the PVD process, the PVD process is not suited for the production of magnetic compound thin film.

Replacing the PVD process, manufacturers recently plan to manufacture magnetic compound thin film featuring satisfactory crystalline characteristic in presence of low temperature by applying "electron cyclotron resonance plasma enhanced chemical vapor deposition" process (hereinafter called ECR-CVD process) using radio wave plasma. This art is disclosed by Japanese Patent Laid-Open No. 60-110112 (1984) and publicized in the publication of Physical Society of Japan, Vol. 22, L210, 1983, by Matsuo and Kikuchi.

SUMMARY OF THE INVENTION

The primary object of the invention is to provide a novel magnetic recording medium having three conditions including (1) thin film having a continuous layer, (2) satisfactory magnetic characteristic better than that of conventional metallic materials, and (3) more satisfactory chemical stability than that of iron oxide, and in addition, the invention also provides a method of and an apparatus for manufacturing the above magnetic recording medium.

To achieve these objects, by generating particles with minute boundaries in thin film containing either $Fe_3C$, or $Fe_5C_2$, or $Fe_2C$, or a plurality of these main components, the magnetic recording medium embodied by the invention is provided with a constitution containing iron carbide which retains high degree of magnetic force, although, inherently, iron carbide merely retains negligible magnetic force. The invention structurally improves magnetic characteristic of iron carbide by processing inheretly stable iron carbide into thin film having either columnar or lumpy structure.

When thin film made of iron carbide mentioned above is deposited on a base layer, one of the crystalline axes is preferably oriented in the direction perpendicular to the substrate surface. According to another film formation process, one of the crystalline axes can also be oriented in the direction parallel to the substrate surface. As a result, the thin film made of iron carbide under the process embodied by the invention is provided with the improved squareness ratio which is the ratio of residual magnetization to the saturation magnetization. Either those elements of elementary groups IVA through VIIA, or elements of platinum group, or nickel, or copper, or alloy of these elements, are used for making up the base layer.

According to a preferred embodiment, using ferrocene (which is substantially biscyclopentadienyl iron, i.e., $Fe(C_5H_5)_2$ as one of organic metallic compounds), novel magnetic recording medium having recording layer which is composed of ferromagnetic thin film made of iron carbide can be manufactured by applying the ECR-CVD method having an atmosphere containing either nitrogen or inert gas.

While implementing the method of manufacturing magnetic recording medium mentioned above, ferromagnetic thin film made of iron carbide is deposited on the substrate such as a glass disc for example. While the production process is underway, quality of the magnetic thin film can properly be controlled by adjusting iron energy entering into the substrate by delivering an optimum voltage to the substrate by insulating the substrate holder supporting it.

When forming the base layer on the substrate, by virtue of using bisbenzene chrome $(C_6H_6)_2Cr$, the manufacturing process can continuously be executed without adversely affecting the vacuumed condition from the formation of the base layer to the eventual formation of ferromagnetic thin film composed of iron carbide.

Furthermore, when depositing thin film on the substrate by applying the ECR-CVD method, a preferred embodiment of the invention provides target in the reactive container accommodating the substrate for supplying a specific voltage to generate sputtering. This allows ferromagnetic thin film to incorporate target component elements, and as a result, the manufacturer can properly control magnetic characteristics of the ferromagnetic thin film.

The invention provides an apparatus for manufacturing the above ferromagnetic thin film with satisfactory efficiency and reproducibility. The apparatus is provided with a system for radiating light against the substrate which allows deposition of ferromagnetic thin film and also a system for controlling more conceivably when gaseous component elements transform themselves into solid phase in the position close to the surface of substrate. Alternatively, the invention provides an apparatus incorporating a system for receiving light generated by electron cyclotron resonance plasma to convert it into electrical signal strength before eventually controlling the magnetic field intensity in order that the signal strength can be maximized. In addition, the apparatus of the invention securely prevents plasma condition from significantly varying itself otherwise varying itself to due even the slightest deviation of the magnetic field intensity. As a result, ferromagnetic thin film can stably be deposited on the substrate.

DESCRIPTION OF THE PREFERRED EMBODIMENTS

First, constitution and features of magnetic recording medium, constitution of the magnetic recording medium manufacturing apparatus, summary of the method of manufacturing the magnetic recording medium according to the invention, and remarks, are briefly explained below.

Figure 3A:
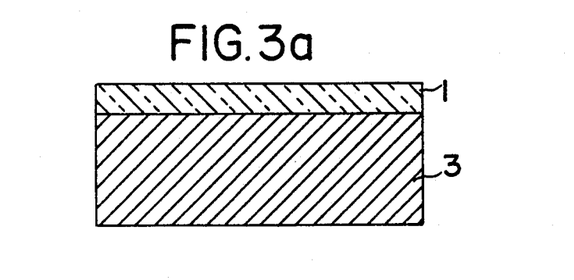
FIG. 3 is the chart denoting the relationship between base layer, magnetic layer, and the substrate.
Figure 3B:
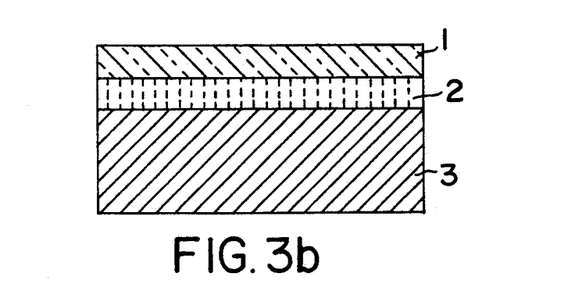

As shown in FIG. 3-a, basically, the magnetic recording medium according to the invention features a constitution in which ferromagnetic thin film layer 1 is formed on the substrate 3 made of soda lime glass or the like or on the substrate 3 having a base layer 2 shown in FIG. 3-b.

Figure 4:
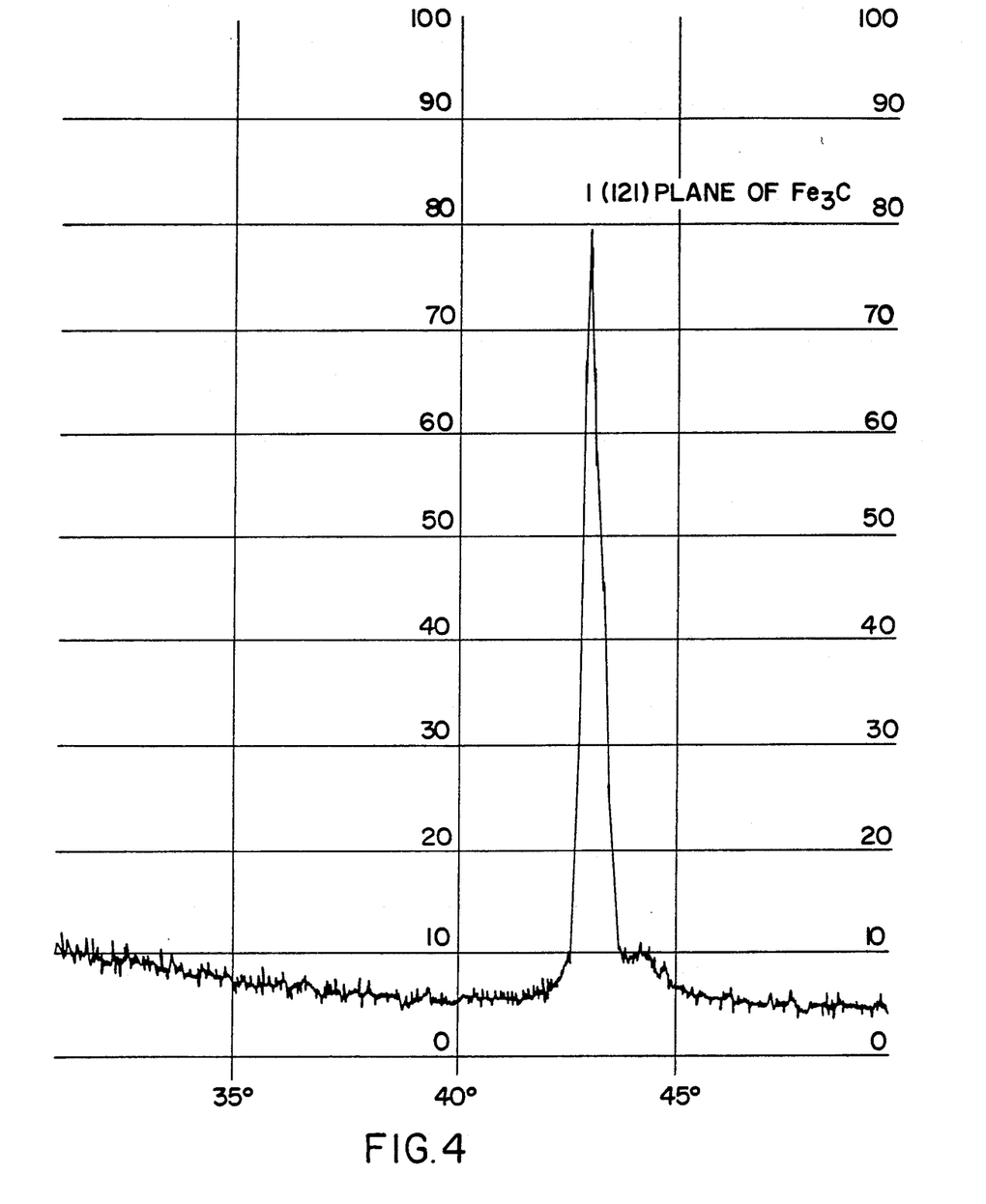
FIG. 4 is the chart denoting the relationship between the intensity of reflection X-ray of thin film having its <121> plane being preferably oriented to the substrate surface in the horizontal direction and the angle formed by incident x-ray and the surface of the thin film by X-ray diffraction.
Figure 5:
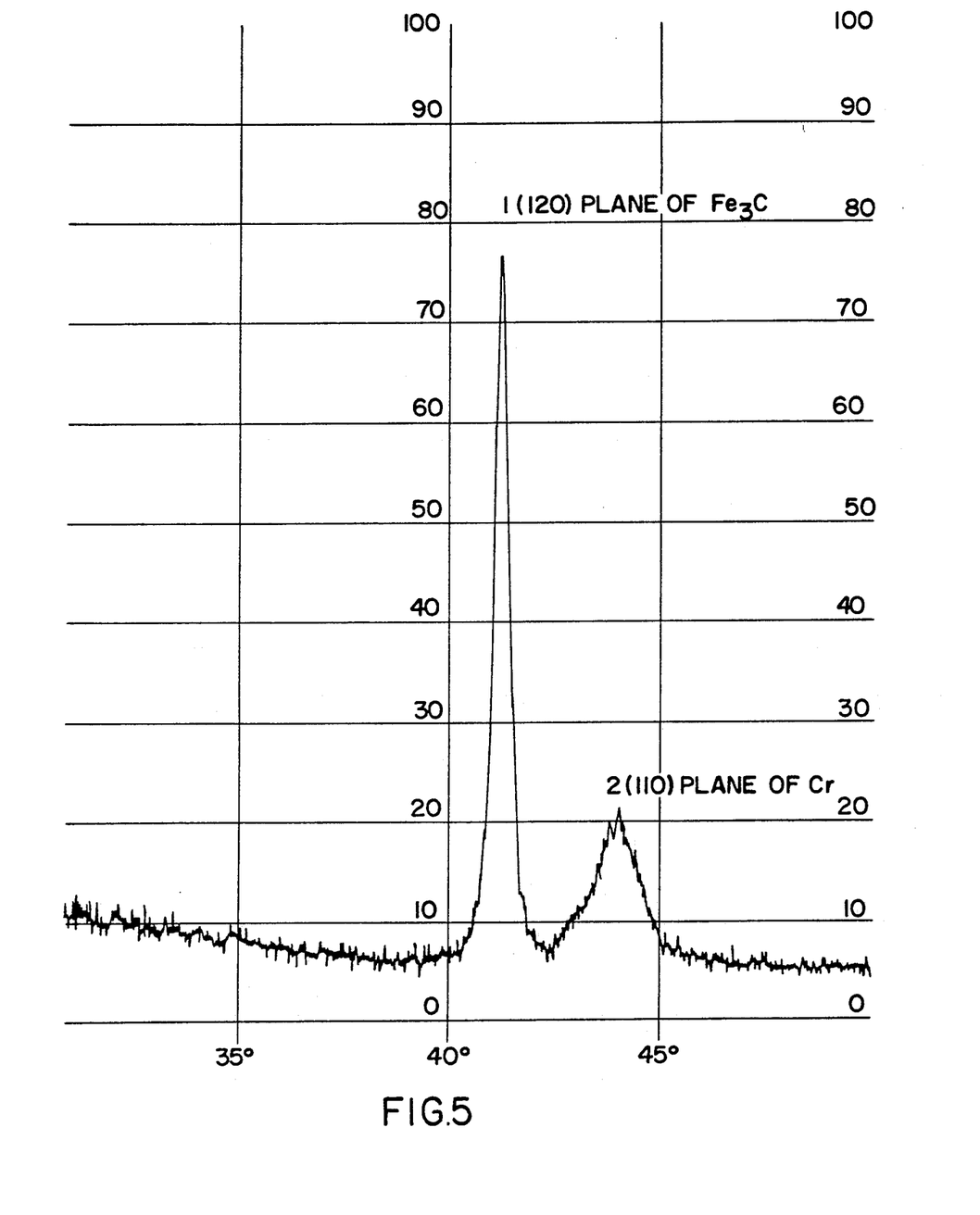
FIG. 5 is the chart denoting the relationship between the intensity of reflection x-ray of thin film having its <120> plane being preferably oriented to the substrate surface in the horizontal direction and the angle formed by incident x-ray and the surface of the thin film by X-ray diffraction.

FIG. 4 is the chart denoting the relationship between the intensity of reflection x-ray and the angle formed by incident x-ray and the surface of the thin film by applying X-ray diffraction to conventional iron carbide thin film having such a constitution as shown in FIG. 3-a. It is clear from FIG. 4 that the <121> plane of $Fe_3C$ compound is preferably oriented to the substrate in the horizontal direction. FIG. 5 denotes the relationship between the intensity of the reflection X-ray and the angle formed by incident X-ray and the surface of the thin film by applying X-ray diffraction to conventional iron carbide thin film having such a constitution as shown in FIG. 3-b. It is clear from FIG. 5 that the <120> plane of $Fe_3C$ compound is preferably oriented to the substrate in the horizontal direction. Accordingly, one of crystalline axes of $Fe_3C$ compound is oriented to the inner surface of thin film formed on the substrate having a base layer.

Figure 1:
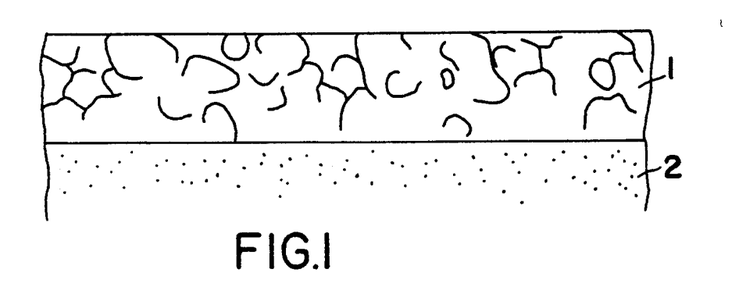
FIG. 1 is the schematic view of thin film having typical lumpy constitution.
Figure 2:
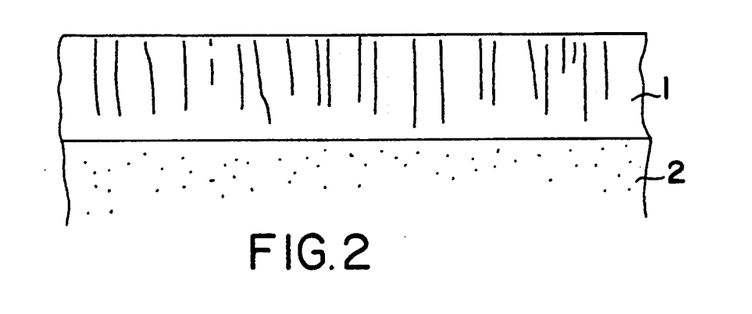
FIG. 2 is the sectional view of thin film having typical columnar constitution.

Magnetic layer 1 of the magnetic recording medium having the constitution shown in FIG. 3 features lumpy structure which is shown in FIG. 1 or columnar structure which is shown in FIG. 2. The lumpy structure means that each grain has a lumpy shape like a ball as shown in FIG. 2. Those fine constitutions shown in FIGS. 1 and 2 provide iron carbide thin film with structural magnetic anisotropy, thus eventually generating quality magnetic thin film featuring high degree of coercive force.

Figure 6:
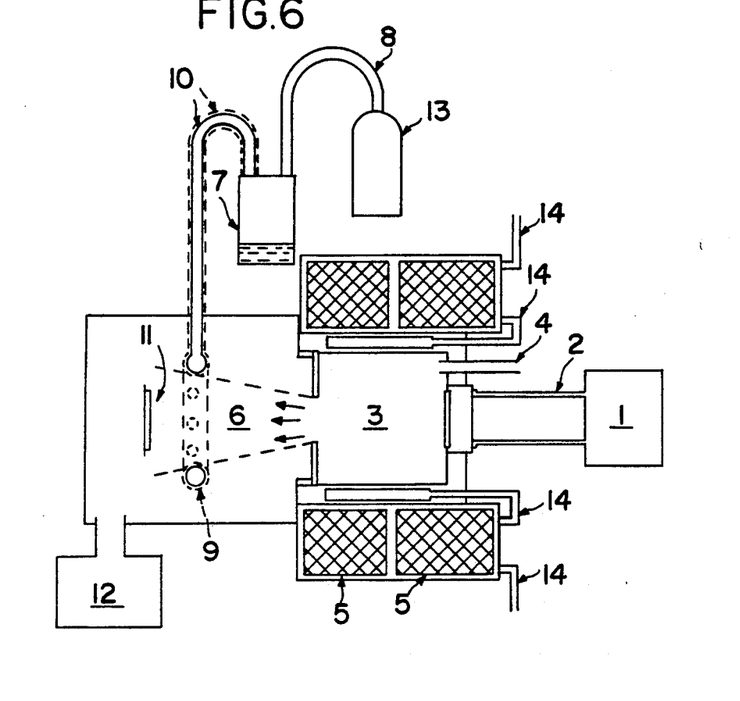
FIG. 6 is the schematic diagram of a preferred embodiment of the apparatus for manufacturing magnetic recording medium according to the invention.

FIG. 6 is the schematic diagram of a preferred embodiment of the magnetic recording medium manufacturing apparatus according to the invention. Microwave generator 1 feeds 4.5 GHz of microwaves to the ECR Plasma-generating chamber 3 through waveguide tube 2. Plasma generating gas containing nitrogen element is delivered to plasma-generating chamber 3 through gas-supply tube 4. Electromagnetic coil 5 generates divergent magnetic field having about 875 gauss of magnetic intensity in the vicinity of the plasma-generating chamber 3 and weaken itself in the direction of the reaction chamber 6. Magnetic field and high-frequency electric field jointly generate electron cyclotron resonance (ECR), and as a result, plasma is effectively generated before eventually being delivered to the reaction chamber 6 by the dispersed magnetic field.

Raw-material ferrocene is held in the carburetor 7 at the predetermined steam-pressurized temperature before eventually being delivered to the reaction chamber 6 via nozzle 9 by means of carrier gas like argon gas fed from carrier gas tube 8. Volume of ferrocene vapor is properly adjusted by temperature of carburetor 7 and the volume of carrier gas flowing through the carrier-gas tube 8. To prevent ferrocene vapor from recrystallizing itself, temperature of ferrocene vapor feeding tube between the carburetor 7 and the nozzle 9 is maintained at a degree about 20% higher than that of the carburetor 7 by operating sheathed heater 10. Ferrocene vapor jetted out of nozzle 9 is dissolved and excited by the ECR plasma delivered through the dispersed magnetic field before eventually being deposited on the substrate 11 in the form of iron carbide. The reference numeral 12 denotes vacuuming unit, 13 gas cylinder containing carrier argon gas for example, and 14 the tube for feeding cold water for cooling the electromagnetic coil.

Tables 1 through 3 respectively denotes a variety of characteristics of the generated thin films when varying components of pressure, high-frequency power, and plasma gas in the reaction chamber by applying the magnetic recording medium manufacturing apparatus according to the invention. In conjunction with Tables 1 through 3, since there was a certain difference in the film thickness, column diameter, coercive force, saturation magnetization, and electrical resistivity between five specimens, average values of these specimens were rated in terms of effective number of two figures.

When analyzing products in the magnetic layer, X-ray diffraction method using $K\alpha$ line of copper and the Mesbauwer method using iron isotopic (Fe57) nucleus were respectively employed. Ratio at % of iron and carbon present in the magnetic thin film was rated by applying X-ray microanalyzer. The thickness of thin film was rated by applying surface profilers DEKTAK 2A. Film structure and column diameter were respectively rated by means of scanning electronic microscope. Coercive force and saturation magnetization were respectively rated by applying a specimenoscillating type magnetic-characteristic measuring instrument. Note that the total of the ratio of iron and carbon present in the magnetic thin film did not aggregate 100% because impurities such as oxygen and nitrogen were present in the tested thin film.

In reference to Table 1, except for the pressure applied to the formation of magnetic thin film, the following conditions were employed. 440W of input high-frequency voltage was used. 12% by volume of ammonia and 88% by volume of hydrogen were employed for composing gas for delivery to the plasma-generating chamber. Argon gas was used for making up carrier gas, whose volume ratio to that of gas delivered to the plasma-generating chamber was merely 0.05% by volume.

In reference to Table 2, except for the high-frequency power applied to the formation of magnetic thin film, the following conditions were employed $3.4 \times 10^{-4}$ Torr of pressure inside of the reaction chamber was used. 12% by volume of ammonia and 88% by volume of hydrogen were used for composing reactive gas for delivery to the plasma-generating chamber. Argon gas was used for making up carrier gas, whose volume ratio to that of reactive gas delivered to the plasma-generating chamber was merely 0.05% by volume.

In reference to Table 3, except for the composition of reactive gas delivered to the plasma-generating chamber when forming magnetic thin film, the following conditions were employed. $3.4 \times 10^4$ Torr of pressure inside of the reaction chamber, and 440W of the input high-frequency power were used. Argon gas was used for making up carrier gas, whose volume ratio to that of reactive gas delivered to the plasma-generating chamber was merely 0.05% by volume. It should be understood that the invention by no means defines use of only those conditions mentioned above.

Tables 4 and 5 respectively denote a variety of physical characteristics of iron carbide thin film formed on various base layers by applying the apparatus according to the invention. In reference to Table 4, it should be noted that the term "glass" shown in the kinds of substrate is substantially made of soda lime, and the term "reinforced glass" is substantially chemically reinforced glass N-5, a product of Hoya Glass Ind. Co., Ltd., Japan. The ECR plasma CVD apparatus shown in FIG. 6 applied the base layers shown in Table 4, whose thin films were preliminarily formed on a glass substrate or a polyimide film by sputtering process.

In reference to Table 5, the film thickness was rated by means of surface profilers DEKTAK 2A. However, since the substrate was more or less subjected to etching effect while the film deposition was underway, it was not possible for the inventors to precisely measure below 10 nm of the film thickness of the base layers on the glass substrate. Likewise, the inventors could not precisely measure below 20 nm of the film thickness of the base layers on the polyimide film.

In conjunction with Tables 4 and 5, the inventors prepared magnetic layers by applying the ECR plasma CVD process and base layers by applying sputtering process. These may also be manufactured by any method other than those which are mentioned above. The base layers were prepared by applying those elements of groups IVA through VIIA, or elements of platinum group, or nickel, or copper. In addition to these, base layers may also be made of such elements which vertically orient one of crystalline axes of iron carbide thin film inside of the surface of against the surface of the substrate.

In conjunction with Table 5, base layers were prepared merely by applying titanium and chrome. Those physical characteristics shown by other elements of groups IVA through VIIA, elements of platinum group, nickel, and copper, respectively indicated specific inclinations almost being similar to those of titanium and chrome used for making up the base layers.

Figure 7:
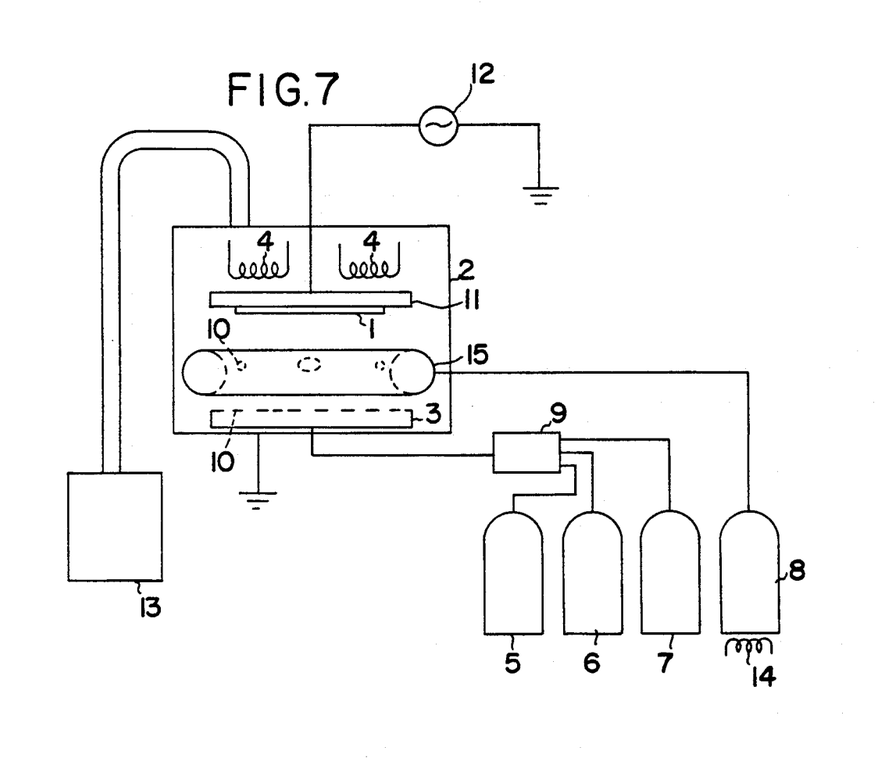
FIG. 7 is the schematic diagram of another preferred embodiment of the apparatus for manufacturing magnetic recording medium according to the invention.

FIG. 7 is the schematic diagram of another preferred embodiment of the apparatus for manufacturing magnetic recording medium according to the invention. Referring to FIG. 7, first, substrate 1 is set below electrode 11 inside of the vacuumed container 2, and then, air is exhausted from the vacuumed container 2 by operating vacuuming unit 13. Next, substrate 1 is heated by heating electrode 11 up to adequate temperature by means of heater 4. Temperature of substrate causes the coercive force to vary itself Next, reductive vapor like hydrogen gas from cylinder 5, vapor containing nitrogen element like nitrogen gas from cylinder 6, and inert vapor like argon gas from cylinder 7, are respectively supplied to the vacuumed container 2 via mixer 9 and through-hole 10 provided for the electrode 3. Next, gaseous ferrocene in the carburetor 8 is heated by heater 14, which is then delivered to the vacuumed container 2 through hole 10 of nozzle 15 before eventually being jetted onto the surface of substrate 1. Next, inner space of the vacuumed container 2 is controlled in order that 0.01 through 10 Torr of vacuuming force can be held constant. Then, plasma discharge is activated by allowing RF power-supply source 12 to deliver 13.56 MHz of high frequency between electrodes 3 and 11 in order that magnetic thin film can eventually be formed on the surface of substrate 1.

Figure 8:
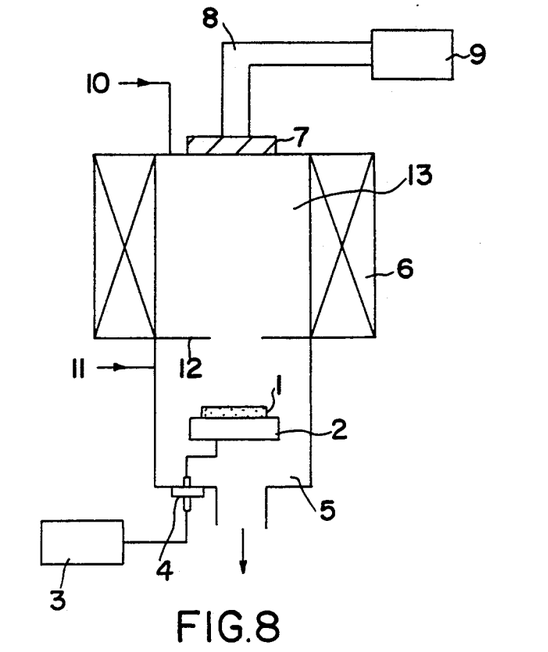
FIG. 8 is the schematic diagram of another preferred embodiment of the apparatus incorporating a system which feeds bias voltage to the substrate for manufacturing magnetic recording medium according to the invention.

FIG. 8 is the schematic diagram of another preferred embodiment of the apparatus for manufacturing magnetic recording medium according to the invention. Referring to FIG. 8, a power-supply source 3 is connected to the conductive substrate holder 2 sucuring the substrate 1 via current-receiving terminal 4. Microwave generated by microwave oscillator 9 and passed through microwave permeating window 7 via waveguide tube 8 reacts with gas fed through ionizing gas inlet 10 inside of the ionizing chamber 13 (where magnetic field generated by the magnetic field generator 6 is present) before eventually generating ECR plasma.

The ECR plasma is led into the reaction processing chamber 5 through ion-extracting window 12. The ion energy incident upon the substrate 1 is controlled by the power-supply source 3, and finally, compound of ion and gas delivered to the reaction processing chamber 5 through re-action-gas inlet 11 is precipitated on the substrate 1. The power-supply source 3 may deal with either DC or AC on condition that it can properly adjust either voltage, or current, or power, and control physical characteristic of magnetic thin film to be generated.

Figure 13:
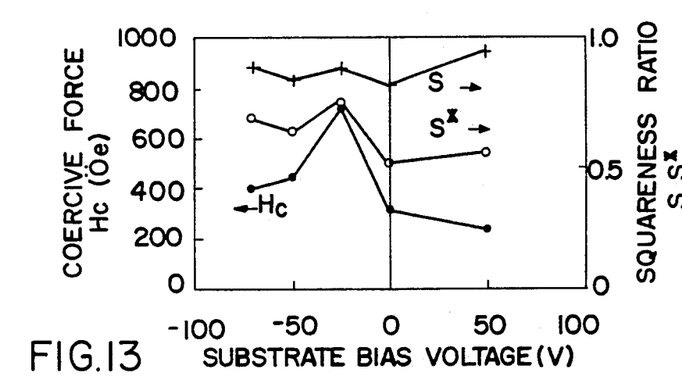
FIG. 13 is the chart denoting the magnetic characteristic of iron carbide thin film when varying a DC voltage delivered to the substrate holder.

FIG. 13 is the chart denoting the relationship between voltages varied by feeding DC voltage to the substrate holder by operating the apparatus according to the invention and the magnetic characteristics of the iron carbide thin film. The term "squareness ratio S" indicates the ratio of residual magnetization to the saturation magnetization, whereas the term "squareness ratio S*" indicates the ratio of the external magnetic field value when magnetized effect starts to sharply decline itself to the value of the coercive force.

Figure 9:
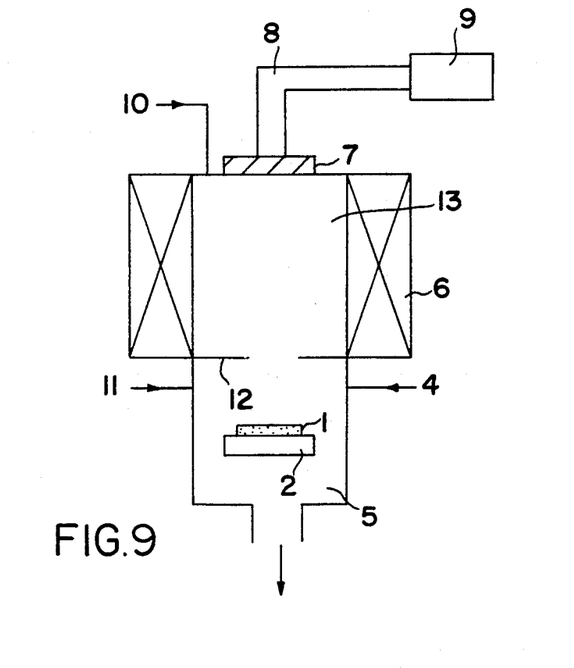
FIG. 9 is the schematic diagram of another preferred embodiment of the apparatus having a plurality of reactive-gas inlets for manufacturing magnetic recording medium according to the invention.

FIG. 9 is the schematic diagram of another preferred embodiment of the apparatus for manufacturing the magnetic recording medium according to the invention. Referring to FIG. 9, microwave generated by the microwave oscillator 9 and passed through the microwave permeating window 7 via waveguide tube 8 reacts with gas fed through ionizing gas inlet 10 inside of the ionizing chamber 13 (where magnetic field generated by the magnetic-field generator 6 is present) before eventually generating ECR plasma.

Ion shower which entered into the reaction processing chamber 5 through the ion-extracting window 12 reacts with gas delivered to the reaction processing chamber 5 through reaction gas inlets 4 and 11 before eventually generating thin film on the substrate 1.

Figure 10:
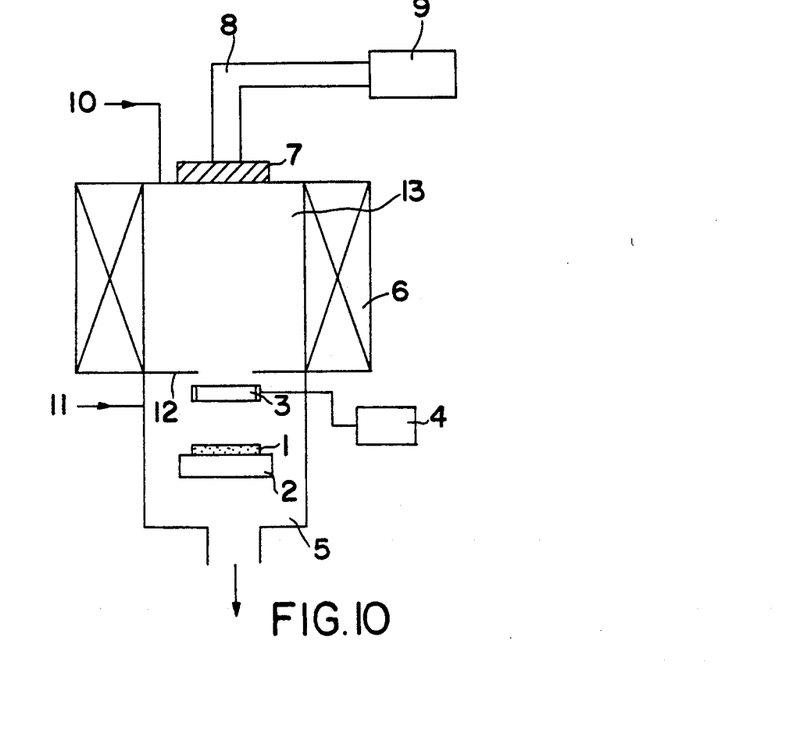
FIG. 10 is the schematic diagram of another preferred embodiment of the apparatus incorporating a cylindrical target for manufacturing magnetic recording medium according to the invention.

FIG. 10 is the schematic diagram of another preferred embodiment of the apparatus for manufacturing the magnetic recording medium according to the invention. Referring to FIG. 10, microwave generated by the microwave oscillator 9 and passed through the microwave permeating window 7 via waveguide tube 8 reacts with gas delivered through the ionizing gas inlet 10 inside of the ionizing chamber (where magnetic field generated by the magnetic-field generator 6 is present) before eventually generating ECR plasma. Ion shower which entered into the reaction processing chamber 5 through the ion-extracting window 12 reacts with gas delivered to the reaction processing chamber 5 via the reaction gas inlets 11 before eventually generating thin film on the substrate 1.

Concurrently, part of ECR plasma emitted out of the ion-extracting window 12 is radiated against cylindrical target 3 to cause sputtering to occur. Power-supply source for generating sputtering may deal with either DC or AC on condition that it can properly adjust either voltage, or current, or power, and control the amount of the target element to be doped into thin film and the composite ratio of compound thin film as well.

Figure 11:
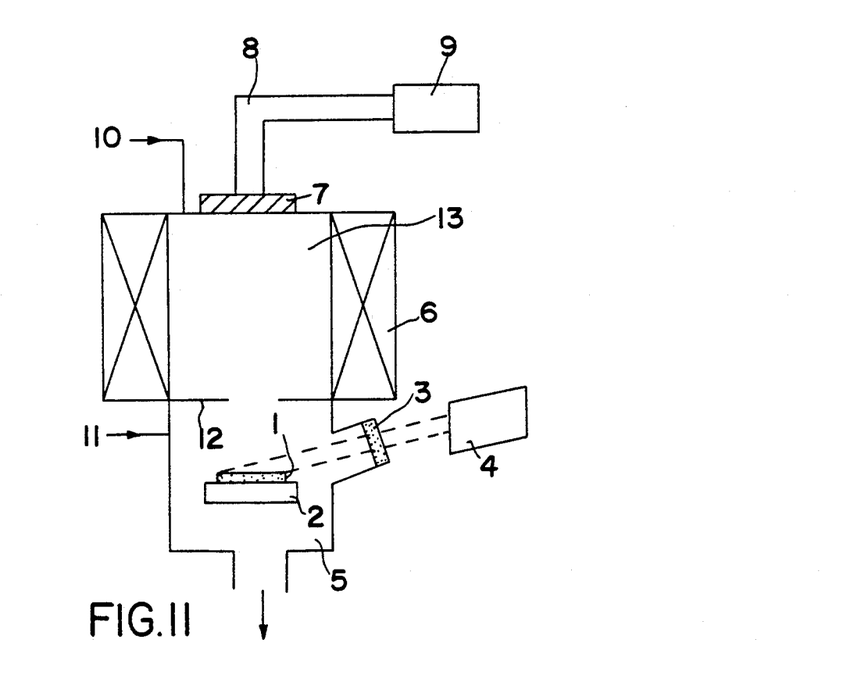
FIG. 11 is the schematic diagram of another preferred embodiment of the apparatus incorporating a system which radiates light against substrate for manufacturing magnetic recording medium according to the invention.

FIG. 11 is the schematic diagram of another preferred embodiment of the apparatus for manufacturing the magnetic recording medium according to the invention. Referring to FIG. 11, microwave generated by the microwave oscillator 9 and passed through the microwave permeating window 7 via waveguide tube 8 reacts with gas delivered through ionizing gas inlet 10 inside of the ionizing chamber 13 (where magnetic field generated by the magnetic-field generator 6 is present) before eventually generating ECR plasma. Ion shower which entered into the reaction processing chamber 5 through the ion-extracting window 12 reacts with gas delivered to the reaction processing chamber 5 through reaction gas inlets 11 before eventually generating thin film on the substrate 1.

Concurrently, light from light source 4 is radiated against the substrate 1 through light-permeating window 3 in order that the reaction of reactive gas near the substrate surface at the time of transforming vapor-phase into solid-phase can properly be controlled by the kinds and the intensity of radiating light. Angle of the substrate 1 and the incident direction of the light source 4 can optionally be varied.

Figure 12:
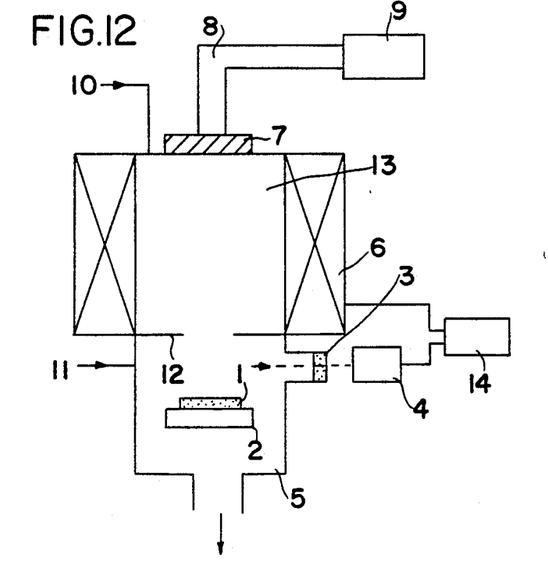
FIG. 12 is the schematic diagram of another preferred embodiment of the apparatus incorporating a system which, on receipt of light generated by plasma, controls the magnetic-field intensity in accordance with the intensity of received light for manufacturing magnetic recording medium according to the invention.

FIG. 12 is the schematic diagram of another preferred embodiment of the apparatus for manufacturing the magnetic recording medium according to the invention. Referring to FIG. 12, microwave generated by the microwave oscillator 9 and passed through the microwave permeating window 7 via waveguide tube 8 reacts with gas delivered through ionizing gas inlet 10 inside of the ionizing chamber 13 (where magnetic field generated by the magnetic-field generator 6 is present) before eventually generating ECR Plasma. Ion shower which entered into the reaction processing chamber 5 through the ion-extracting window 12 reacts with gas delivered to the reaction processing chamber 5 through reaction gas inlets 11 before eventually generating thin film on the substrate 1.

Concurrently, photo-receiver 4 receives light emitted by ECR plasma via the light-permeating window 3, and then the magnetic-field adjuster 14 transmits signals corresponding to the output from the photo-receiver 4 to the magnetic-field generator 6 in order that the intensity of magnetic field inside of the ionizing chamber 13 can properly be adjusted.

Figure 14:
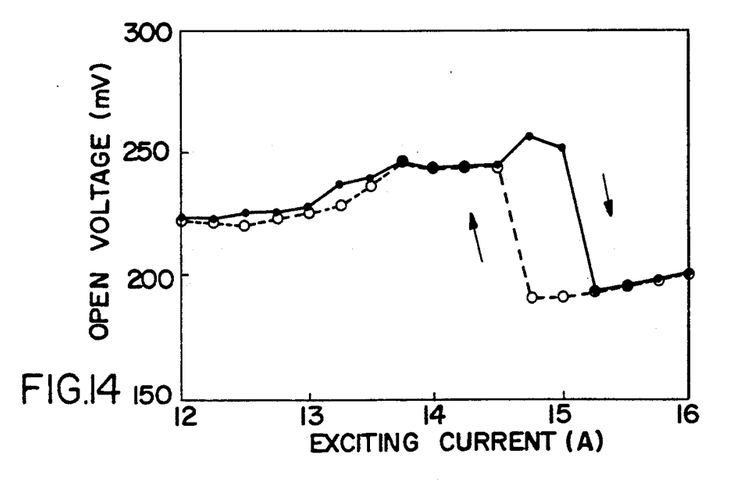
FIG. 14 is the chart denoting the relationship between excited current delivered to magnetic-filed generator and open voltage of photoreceiving photodiode when varying magnetic-field intensity by applying magnetic field adjuster.

FIG. 14 is the chart denoting the relationship between the exciting current delivered to the magnetic-field generator 6 when causing the magnetic-field adjuster 14 to vary the intensity of magnetic field by operating the apparatus according to the invention and the open voltage of photo-receiving photo diode. Solid line represents the value of open voltage when increasing the exciting current, whereas broken line represents the value of open voltage when decreasing the exciting current.

EXAMPLE 1

Table 1 represents a variety of physical characteristics of magnetic thin film produced by the magnetic recording medium manufacturing apparatus shown in FIG. 6 when varying internal pressure of the reaction chamber.

As is clear from Table 1, satisfactory magnetic characteristics of the recording media can be generated when either $Fe_3C$, or $Fe_5C_2$, or $Fe_2C$ being the main component is present in the magnetic thin film. It is also clear that satisfactory magnetic characteristic of recording medium can be generated when thin film has lumpy structure shown in FIG. 1 or columnar structure shown in FIG. 2, and yet, when the column has a maximum of 2,000 Å (angstrom) of diameter.

TABLE 1

| No | Pressure (Torr) | Fe (at %) | C (at %) | Film thickness (nm) | Film structure | Column diameter | Coercive force (Oe) | Saturation magnetization (emµ/cc) | Resistivity (µΩ·cm) | Products other than Fe and C |
|---|---|---|---|---|---|---|---|---|---|---|
| 1 | $1.0 \times 10^{-3}$ | 48 | 40 | 520 | Non-Structure | — | 70 | 70 | $3.2 \times 10^6$ | — |
| 2 | $7.0 \times 10^{-4}$ | 51 | 37 | 100 | Lumpy | 2500 | 210 | 390 | $6.6 \times 10^3$ | $Fe_3C$ |
| 3 | " | 52 | 38 | 510 | Non-structure | — | 190 | 120 | $8.4 \times 10^4$ | " |
| 4 | $5.0 \times 10^{-4}$ | 55 | 35 | 120 | Lumpy | 1800 | 440 | 570 | 330 | $Fe_3C.Fe_5C_2$ |
| 5 | " | 55 | 34 | 500 | " | 2500 | 280 | 790 | 180 | " |
| 6 | $4.0 \times 10^{-4}$ | 51 | 33 | 110 | Colmunar | Below 300 | 620 | 970 | 150 | $Fe_3C.Fe_2C$ $Fe_5C_2$ |
| 7 | " | 57 | 31 | 520 | Colmunar | Below 300 | 550 | 1000 | 160 | $Fe_3C.Fe_5C_2$ |
| 8 | $3.0 \times 10^{-4}$ | 61 | 27 | 110 | Colmunar | Below 300 | 800 | 1100 | 100 | " |
| 9 | " | 60 | 27 | 510 | Colmunar | Below 300 | 790 | 930 | 120 | " |
| 10 | $1.0 \times 10^{-4}$ | 59 | 30 | 100 | Colmunar | Below 300 | 740 | 870 | 61 | " |
| 11 | " | 50 | 31 | 490 | Colmunar | Below 300 | 710 | 810 | 72 | " |
| 12 | $7.0 \times 10^{-5}$ | 55 | 37 | 110 | Colmunar | 1000 | 650 | 540 | 120 | " |
| 13 | " | 55 | 34 | 470 | Colmunar | 1100 | 630 | 430 | 130 | " |
| 14 | $5.0 \times 10^5$ | 57 | 36 | 100 | Non-structure | — | 340 | 140 | 570 | $Fe_5C_2$ |

Description of those preferred embodiments of the method of and apparatuses for manufacturing the magnetic recording medium according to the invention has merely referred to the ECR-CVD process and the plasma CVD process by applying radio waves. It should be understood that, in addition to those process mentioned above, ion-plating process and magnetron plasma CVD process may also be employed for manufacturing the magnetic recording medium according to the invention. Even when employing those methods shown in the preferred embodiments, as far as the objective magnetic recording medium can securely be manufactured, parameter may optionally be changed, although the foregoing description of those preferred embodiments has not referred to parameter at all.

EXAMPLE 2

FIG. 2 represents a variety of physical characteristics of thin film produced by the apparatus shown in FIG. 6 when varying high frequency power which is delivered to the plasma-generating chamber.

It is clear from Table 2 that satisfactory magnetic characteristic of the recording medium can be generated when $Fe_3C$, or $Fe_5C_2$, or $Fe_2C$ being the main component is present in the magnetic thin film. It is also clear that satisfactory magnetic characteristic of recording medium can be generated when thin film has either lumpy structure shown in FIG. 1 or columnar structure shown in FIG. 2.

TABLE 2

| No | Pressure (Torr) | Fe (at %) | C (at %) | Film thickness (nm) | Film structure | Column diameter | Coercive force (Oe) | Saturation magnetization (emµ/cc) | Resistivity (µΩ·cm) | Products other than Fe and C |
|---|---|---|---|---|---|---|---|---|---|---|
| 1 | 50 | 30 | 51 | 100 | Non- | — | — | Below 10 | $1.4 \times 10^7$ | — |

TABLE 2-continued

| No | Pressure (Torr) | Fe (at %) | C (at %) | Film thickness (nm) | Film structure | Column diameter | Coercive force (Oe) | Saturation magnetization (emµ/cc) | Resistivity (µΩ·cm) | Products other than Fe and C |
|---|---|---|---|---|---|---|---|---|---|---|
| 2 | " | 39 | 46 | 550 | Non-Structure | — | — | " | 1.5 × 10⁷ | — |
| 3 | 100 | 50 | 40 | 120 | Non-Structure | — | 170 | 140 | 3.5 × 10⁴ | — |
| 4 | " | 49 | 42 | 530 | Non-Structure | — | 160 | 170 | 3.9 × 10⁴ | — |
| 5 | 200 | 54 | 33 | 100 | Lumpy | 1000 | 370 | 500 | 190 | Fe₂C |
| 6 | " | 55 | 33 | 510 | " | 1500 | 410 | 410 | 200 | Fe₂C.Fe₅C₂ |
| 7 | 300 | 56 | 36 | 110 | Colmunar | 900 | 640 | 740 | 160 | Fe₃C.Fe₅C₂ |
| 8 | " | 55 | 37 | 470 | Lumpy | 700 | 650 | 820 | 150 | " |
| 9 | 400 | 59 | 30 | 100 | Colmunar | Below 300 | 720 | 1100 | 120 | " |
| 10 | " | 57 | 33 | 490 | Colmunar | Below 300 | 720 | 1200 | 130 | " |
| 11 | 500 | 63 | 29 | 100 | Colmunar | Below 300 | 770 | 950 | 110 | " |
| 12 | " | 62 | 29 | 490 | Colmunar | Below 300 | 750 | 960 | 110 | " |
| 13 | 600 | 64 | 27 | 110 | Colmunar | 500 | 510 | 730 | 87 | " |
| 14 | " | 65 | 27 | 500 | Colmunar | 800 | 460 | 700 | 76 | " |
| 15 | 700 | 68 | 23 | 130 | Non-Structure | — | 270 | 470 | 310 | Fe₃C |
| 16 | " | 69 | 22 | 520 | Non-Structure | — | 320 | 460 | 400 | Fe₃C.Fe₅C₂ |

EXAMPLE 3

Table 3 represents a variety of physical characteristics of thin film produced by the apparatus shown in FIG. 6 when varying gas component which is delivered to the plasma-generating chamber.

As is clear from Table 3, satisfactory magnetic characteristic of recording medium can be generated when either $Fe_3C$ or $Fe_5C_2$ being the main component is present in the magnetic thin film. It is also clear that satisfactory magnetic characteristic of recording medium can be generated when thin film has either lumpy structure shown in FIG. 1 or columnar structure shown in FIG. 2, and yet, when column has a maximum of 2,000 Å (angstrom) of diameter. Furthermore, it is also clear that, when applying iron carbide produced by vapor-phase dissolution chemical reaction of ferrocene with ECR plasma in the atmosphere containing nitrogen element, and yet, if the atmosphere containing nitrogen element were like the one containing either vaporized ammonia anhydride or compound of nitrogen gas and hydrogen gas, then, satisfactory magnetic characteristics of recording medium can securely be generated.

TABLE 3

| No | Pressure (Torr) | Fe (at %) | C (at %) | Film thickness (nm) | Film structure | Column diameter | Coercive force (Oe) | Saturation magnetization (emµ/cc) | Resistivity (µΩ·cm) | Products other than Fe and C |
|---|---|---|---|---|---|---|---|---|---|---|
| 1 | N₂(100) | 41 | 42 | 610 | Non-Structure | — | — | Below 10 | 1.4 × 10⁷ | — |
| 2 | N₂(90) H₂(10) | 49 | 40 | 540 | Non-Structure | — | 70 | " | 1.5 × 10⁷ | — |
| 3 | N₂(75) H₂(25) | 50 | 37 | 530 | Lumpy | 2500 | 220 | " | 3.5 × 10⁴ | Fe₂C.Fe₅C₂ |
| 4 | N₂(50) H₂(50) | 55 | 35 | 550 | Lumpy | 2200 | 480 | 199 | 3.9 × 10⁴ | Fe₅C₂ |
| 5 | N₂(25) H₂(75) | 61 | 28 | 480 | Colmunar | 700 | 700 | 770 | 190 | Fe₃C.Fe₅C₂ |
| 6 | N₂(10) H₂(90) | 59 | 29 | 510 | Colmunar | Below 300 | 780 | 1100 | 200 | " |
| 7 | N₂(5) H₂(95) | 67 | 24 | 500 | Colmunar | Below 300 | 620 | 940 | 160 | " |
| 8 | N₂(90) Ar(10) | 36 | 50 | 620 | Non-structure | — | — | Below 10 | 2.7 × 10⁸ | — |
| 9 | N₂(75) Ar(25) | 34 | 52 | 550 | Non-structure | — | — | " | 3.9 × 10⁸ | — |
| 10 | N₂(50) Ar(50) | 29 | 59 | 570 | Non- | — | — | " | 5.3 × 10⁶ | — |

TABLE 3-continued

| No | Pressure (Torr) | Fe (at %) | C (at %) | Film thickness (nm) | Film structure | Column diameter | Coercive force (Oe) | Saturation magnetization (emμ/cc) | Resistivity (μΩ·cm) | Products other than Fe and C |
|---|---|---|---|---|---|---|---|---|---|---|
| 11 | $N_2$(25) Ar(75) | 33 | 56 | 520 | Non-structure | — | — | " | $1.5 \times 10^7$ | — |
| 12 | $N_2$(10) Ar(90) | 40 | 51 | 520 | Non-structure | — | 80 | " | $5.7 \times 10^7$ | $Fe_2C$ |
| 13 | $NH_3$(100) | 58 | 10 | 490 | Colmunar | 900 | 420 | 670 | 180 | $Fe_3C.Fe_2N$ |
| 14 | $NH_3$(50) $H_2$(50) | 58 | 11 | 510 | Colmunar | Below 300 | 430 | 660 | 160 | " |
| 15 | $NH_3$(25) $H_2$(75) | 59 | 16 | 500 | Colmunar | Below 300 | 660 | 1140 | 130 | $Fe_3C$ |
| 16 | $NH_3$(10) $H_2$(90) | 62 | 27 | 490 | Colmunar | Below 300 | 720 | 1070 | 150 | $Fe_3C.Fe_2C_2$ |
| 17 | $NH_3$(5) $H_2$(90) | 59 | 31 | 490 | Colmunar | Below 300 | 340 | 480 | 160 | " |

EXAMPLE 4

Table 4 represents a variety of physical characteristics of iron carbide thin film produced by the apparatus shown in FIG. 1 on a variety of substrates made from different kinds of materials. It is clear from Table 4 that magnetic thin film having satisfactory squareness ratio (which is the ratio of residual magnetization to the saturation magnetization) by preferably orienting one of crystalline axes of iron carbide thin film when forming ferromagnetic thin film made of iron carbide on those substrates provided with preliminarily formed base layers.

TABLE 4

| No. | Substrate | Grounding layer | Magnetic film thickness (nm) | Grounding layer thickness (nm) | X-ray analysis results | Coercive force (Oe) | Squareness ratio | Saturation magnetization (emμ/cc) | Resistivity (μΩ·cm) |
|---|---|---|---|---|---|---|---|---|---|
| 1 | Glass | — | 510 | — | <121> plane preferred orientation | 760 | .75 | 1100 | 150 |
| 2 | Reinforced glass | — | 500 | — | <121> plane preferred orientation | 560 | .81 | 1200 | 130 |
| 3 | Si | — | 500 | — | <121> plane preferred orientation | 720 | .84 | 980 | 110 |
| 4 | Polyimide resin | — | 550 | — | Amorphous | 710 | .67 | 1120 | 140 |
| 5 | Al | — | 570 | — | Not specially oriented | 720 | .84 | 700 | 130 |
| 6 | Glass | Ti | 520 | 110 | <120> plane preferred orientation | 750 | .98 | 970 | 130 |
| 7 | " | Ta | 560 | 110 | <120> plane preferred orientation | 730 | .90 | 840 | 120 |
| 8 | " | Cr | 550 | 100 | <120> plane preferred orientation | 750 | .90 | 1160 | 130 |
| 9 | " | W | 540 | 100 | <120> plane preferred orientation | 610 | .93 | 1070 | 150 |
| 10 | " | Re | 540 | 110 | <120> plane preferred orientation | 770 | .94 | 980 | 160 |
| 11 | " | Ru | 540 | 100 | <120> plane preferred orientation | 640 | .93 | 900 | 160 |
| 12 | " | Pt | 560 | 100 | <120> plane preferred orientation | 680 | .95 | 900 | 160 |
| 13 | " | Ni | 550 | 110 | <120> plane preferred orientation | 700 | .92 | 1050 | 160 |
| 14 | " | Cu | 550 | 120 | <120> plane preferred orientation | 560 | .92 | 720 | 160 |
| 15 | Polyimide resin | Ti | 530 | 110 | <120> plane preferred orientation | 770 | .97 | 1110 | 180 |

TABLE 4-continued

| No. | Substrate | Grounding layer | Magnetic film thickness (nm) | Grounding layer thickness (nm) | X-ray analysis results | Coercive force (Oe) | Square-ness ratio | Saturation magnetization (emµ/cc) | Resistivity (µΩ · cm) |
| --- | --- | --- | --- | --- | --- | --- | --- | --- | --- |
| 16 | Polyimide resin | Cr | 520 | 110 | <120> plane preferred orientation | 730 | .92 | 1120 | 170 |

EXAMPLE 5

Table 5 represents a variety of physical characteristics of iron carbide thin film produced by the apparatus shown in FIG. 1 on a variety of grounding layers having varied film thickness. It is clear from Table 5 that, independent of the thickness, the base layer which is preliminarily provided on the substrate has function to preferably orient easy magnetization axis of iron carbide thin film generated on the base layer.

inventors exhausted air from vacuum container 2 so that internal pressure can be held at $1.0 \times 10^6$ Torr. Next, inventors delivered hydrogen gas to the vacuumed container 2 from cylinder 5, nitrogen gas to this container from cylinder 6, and carrier argon gas to it from cylinder 7, respectively. Table 6 denotes the volume ratio of hydrogen gas, nitrogen gas, argon gas and the physical characteristic of magnetic thin film. Note that hydrogen gas, nitrogen gas, and argon gas were respectively delivered to the vacuumed container 2 by 80

TABLE 5

| No. | Substrate | Grounding layer | Magnetic film thickness (nm) | Grounding layer thickness (nm) | X-ray analysis results | Coercive force (Oe) | Square-ness ratio | Saturation magnetization (emµ/cc) | Resistivity (µΩ · cm) |
| --- | --- | --- | --- | --- | --- | --- | --- | --- | --- |
| 1 | Glass | — | — | 590 | <121> plane preferred orientation | 760 | .75 | 1100 | 150 |
| 2 | " | Ti | 10 | 540 | <120> plane preferred orientation | 750 | .92 | 890 | 140 |
| 3 | " | " | 20 | 550 | <120> plane preferred orientation | 750 | .97 | 960 | 140 |
| 4 | " | " | 50 | 540 | <120> plane preferred orientation | 760 | .97 | 980 | 140 |
| 5 | " | " | 110 | 570 | <120> plane preferred orientation | 750 | .98 | 970 | 130 |
| 6 | " | Cr | 10 | 520 | <120> plane preferred orientation | 750 | .89 | 980 | 140 |
| 7 | " | " | 20 | 540 | <120> plane preferred orientation | 750 | .92 | 1100 | 140 |
| 8 | " | " | 50 | 500 | <120> plane preferred orientation | 750 | .91 | 1110 | 140 |
| 9 | " | " | 100 | 530 | <120> plane preferred orientation | 750 | .90 | 1160 | 140 |
| 10 | Polyimide resin | — | — | 580 | Amorphous | 710 | .67 | 1120 | 140 |
| 11 | Polyimide resin | Ti | 20 | 520 | <120> plane preferred orientation | 700 | .94 | 1070 | 160 |
| 12 | Polyimide resin | " | 50 | 570 | <120> plane preferred orientation | 750 | .97 | 1140 | 170 |
| 13 | Polyimide resin | " | 110 | 570 | <120> plane preferred orientation | 770 | .97 | 1110 | 180 |
| 14 | Polyimide resin | Cr | 20 | 560 | <120> plane preferred orientation | 660 | .90 | 1010 | 160 |
| 15 | Polyimide resin | " | 50 | 520 | <120> plane preferred orientation | 700 | .94 | 1120 | 170 |
| 16 | Polyimide resin | " | 120 | 540 | <120> plane preferred orientation | 730 | .92 | 1120 | 170 |

EXAMPLE 6

When operating the plasma-generating device shown in FIG. 7, inventors used a substrate made of glass. After heating the substrate to 200° C. with heater 4, cm³/min. of volume in total. Next, inventors delivered gaseous ferrocene from carburetor 8 to the vacuumed container 2 by 5 cm³/min. of volume. Then, while controlling the internal vacuum pressure of the vacuumed container 2 at 0.1 Torr, inventors delivered 300 W and 13.56 MHz of high frequency to the vacuumed container 2 from RF power-supply source 12, and then continuously formed magnetic thin film for a period of 30 minutes.

Table 6 represents magnetic characteristic of the produced thin film and the product present in this thin film as confirmed by X-ray analysis.

It is clear from Table 6 that iron carbide featuring quite satisfactory magnetic characteristic was generated when the volume of nitrogen gas was 0.02 through 0125 times the volume of hydrogen gas in the mol ratio. In addition, iron carbide containing a certain amount of carbon variable by the volume of nitrogen gas was also generated.

TABLE 6

| Sample | $N_2$ volume $(cm^3)$ | $H_2$ volume $(cm^3)$ | Ar volume $(cm^3)$ | $N_2/H_2$ | Hc (Oe) | Bm (G) | Products |
| --- | --- | --- | --- | --- | --- | --- | --- |
| 1 | 8.0 | 72.0 | 0 | 0.11 | 500 | 2500 | $Fe_5C_2$ |
| 2 | 0.75 | 74.25 | 5 | 0.01 | 200 | 300 | $Fe_2C$ |
| 3 | 1.5 | 73.5 | 5 | 0.02 | 400 | 9500 | $Fe_5C_2$ |
| 4 | 7.5 | 67.5 | 5 | 0.11 | 550 | 12000 | $Fe_3C$ |
| 5 | 15.5 | 60.0 | 5 | 0.25 | 250 | 10000 | $Fe_3C$ |
| 6* | 17.5 | 57.5 | 5 | 0.30 | — | — | — |
| 7 | 6.0 | 54.0 | 10 | 0.11 | 540 | 12000 | $Fe_3C$ |

*Dark brown thin film

EXAMPLE 7

When operating the plasma-generating device shown in FIG. 8, inventors delivered 40 SCCM and 5 SCCM of hydrogen and nitrogen to the plasma-generating device through the ionizing gas inlet 10. In addition, inventors also delivered gaseous ferrocene mixed with 5 SCCM of carrier argon gas through the reactive-gas inlet 11 before eventually generating iron carbide ferromagnetic thin film on the glass substrate 1. DC power sufficed the needs for the power-supply source 3. FIG. 13 represents the magnetic characteristic of iron carbide thin film when varying the DC voltage.

As is clear from FIG. 13, it was confirmed that, compared to iron carbide thin film which dispensed with substrate bias voltage, iron carbide thin film which received substrate bias voltage according to the method of manufacturing the magnetic recording medium according to the invention eventually generated the improved coercive force. Furthermore, the iron carbide thin film produced by the method according to the invention securely improves the effect of magnetization relative to the magnetic hysteresis is characteristic and also improves the squareness ratio of the coercive force. This offers substantial advantage when using iron carbide thin film for constituting high-density magnetic recording medium.

EXAMPLE 8

When operating the plasma-generating device shown in FIG. 9, inventors delivered 40 SCCM and 5 SCCM of hydrogen and nitrogen to this device through the ionizing gas inlet 10. Next, inventors fed bisbenzene chrome $(C_6H_6)_2Cr$ through the first reactive gas inlet 4 and gaseous ferrocene through the second reactive gas inlet 1111. Then, inventors produced a chrome base layer on the glass substrate 1 before eventually generating iron carbide ferromagnetic thin film on the chrome base layer film.

For comparison, by applying the same condition as above, inventors also produced magnetic thin film which dispensed with the chrome base layer. Physical characteristic of the magnetic thin film according to the method of the invention and the other magnetic thin film dispensed with the base layer film are respectively presented in Table 7.

It is clear from Table 7 that, unlike the formation of the base layer using sputtering device shown in Examples 4 and 5, the preferred embodiment shown in Example 8 continuously generated iron carbide ferromagnetic thin film on the substrate which is preliminarily provided with the base layer without adversely affecting the vacuum condition, and yet, preferentially orients the easy magnetization axis of the ferromagnetic thin film, thus making it possible for the preferred embodiment shown in Example 8 to securely produce ferromagnetic thin film featuring a satisfactory squareness ratio.

TABLE 7

| | Coercive force (Oe) | S | S* | X-ray analysis results |
| --- | --- | --- | --- | --- |
| With base layer | 451 | 90 | 81 | <120> plane preferred orientation |
| Without base layer | 467 | 75 | 66 | <121> plane preferred orientation |

EXAMPLE 9

When operating the plasma-generating device shown in FIG. 10, inventors delivered 40 SCCM and 5 SCCM of hydrogen and nitrogen to this device through the ionizing gas inlet 10, respectively. Then, inventors also fed 5 SCCM of carrier argon gas mixed with gaseous ferrocene to the plasma-generating device through the reactive gas inlet 11 before eventually producing iron carbide ferromagnetic thin film on the glass substrate 1. When executing these processes, inventors used cobalt cylinder for making up target 3, and then, inventors adjusted power of the sputtering power-supply source 4, and finally added cobalt to iron carbide thin film to result in the improved magnetic characteristic.

For comparison, by applying the same condition as above, inventors also produced magnetic thin film which dispensed with addition of cobalt. Physical characteristics of the magnetic thin film according to the method of the invention and the other magnetic thin film without addition of cobalt are presented in Table 8. As is clear from Table 8, by virtue of the method of and apparatus for manufacturing the magnetic thin film according to the invention, compared to the other magnetic thin film without addition of cobalt, the cobalt-added iron carbide thin film provides the improved coercive force.

TABLE 8

|  | Saturation magnetization (emμ/cc) | Coercive force (Oe) | Carbon density (at %) | Cobalt density (at %) |
|---|---|---|---|---|
| Cobalt added | 760 | 800 | 27 | 9 |
| Cobalt not added | 750 | 650 | 26 | 0 |

EXAMPLE 10

When operating the plasma-generating device shown in FIG. 11, inventors provided this device with hydrogen or nitrogen through the ionizing gas inlet 10 and gaseous ferrocene mixed with 5 SCCM of carrier hydrogen gas through the reactive gas inlet 11, respectively. Inventors then produced iron carbide ferromagnetic thin film on the glass substrate 1. To constitute light source 4, inventors used either a $CO_2$ laser having 50 W of continuous maximum output capacity and 10.6μ of wave length or an ArF excimer laser having 0.5 W of continuous maximum output capacity and 193 nm of wave length. When formation of thin film was underway, the reaction processing chamber retained $5.0 \times 10^3$ Pa of vacuum rating.

For comparison, by applying the same condition as above, inventors produced magnetic thin film without radiating laser beams at all. Products generated in the magnetic thin film according to the method of the invention and the other one prepared for comparison are respectively presented in Table 9. As is clear from Table 9, even when such a specific condition is employed in which only insulative thin film composed of polymerized ferrocene is merely produced without receiving laser beams, by virtue of the method of and apparatus for manufacturing the magnetic thin film according to the invention, due to radiation of either the $CO_2$ laser beams or the ArF excimer laser beams against compound of gaseous ferrocene and carrier hydrogen gas, either conductive iron carbide thin film or iron carbon nitride compound thin film can stably be generated.

TABLE 9

| Gas/Light source | $CO_2$ laser | ArF laser | No light source |
|---|---|---|---|
| $H_2$ (45SCCM) | $Fe_3C$ | $Fe_3C$ | Polymer |
| $H_2$ (40SCCM) + $N_2$ (5SCCM) | $Fe_5C_2$ | Fe-N-C | Polymer |

EXAMPLE 11

When operating the plasma-generating device shown in FIG. 12, inventors delivered 40 SCCM of hydrogen and 5 SCCM of nitrogen to this device through ionizing gas inlet 10 and also delivered gaseous ferrocene mixed with 5 SCCM of carrier argon gas to this device through the reactive gas inlet 11, respectively. Inventors then produced iron carbide ferromagnetic thin film on the glass substrate 1. Inventors used silicon-made planar diffusion type PN junction photo diode for constituting photoreceiver 4. While the formation of thin film was underway, the vacuum condition inside of the reaction processing chamber 5 was variable by the variation of the magnetic-field intensity. Actually, vacuum condition was variable from $5.0 \times 10^1$ to $5.0 \times 10^4$ Pa. 400 W of microwave power was employed.

FIG. 14 is the chart denoting the relationship between the exciting current delivered to the magnetic-field generator 6 and the open voltage of photodiode of the photoreceiver 4 when varying the intensity of magnetic field by applying the magnetic-field adjuster 14. As shown in the arrowed direction, open voltage of photo-diode shows hysteresis characteristic when increasing and decreasing the exciting current.

The preferred embodiment cited in Example 11 provides about 15A (ampere) of exciting current. Table 10 represents physical characteristic of iron carbide and iron carbon nitride films produced by applying the film-forming process when the open voltage generated by hysteresis controls magnetic field at the peak region and the bottom region.

As is clear from Table 10, by virtue of the method of and apparatus for manufacturing magnetic thin film used for implementing those preferred embodiments described above, intensity of magnetic field can be held constant, which otherwise delicately varies itself if being left as it is, by monitoring beams generated by ECR Plasma, and as a result, quality of the manufactured magnetic thin film can significantly be improved and the film formation process can constantly be executed very fast.

TABLE 10

| Check items | Open voltage High | Open voltage Low |
|---|---|---|
| Electrical resistivity | 90 μΩ cm | 520 μΩ cm |
| Crystalline characteristic | Good | Close to amorphous |
| Coercive force | 780 Oe | 350 Oe |
| Film deposition rate | 150 Å/min. | 50 Å/min. |

What is claimed is:

1. A magnetic recording medium comprising:
   a substrate; and
   a ferromagnetic thin film deposited on a surface of said substrate and having a minimum of 400 Oe of coercive force, said ferromagnetic thin film being composed mainly of an iron carbide and wherein said ferromagnetic thin film comprises at least one member selected from the group consisting of $Fe_3C_2$, $Fe_5C_3$ and $Fe_2C$ and wherein said ferromagnetic thin film has a columnar structure with a minimum of 2000 Å column diameter or a lumpy structure.

2. A magnetic recording medium as set forth in claim 1, wherein said ferromagnetic thin film contains 50 to 69 at % of iron (Fe) and 11 to 38 at % of carbon (C).

3. A magnetic recording medium comprising:
   a substrate;
   a base layer formed on said substrate, said base layer being composed mainly of at least one of an element in the IVA group through the VIIA group of the Periodic Table, an element of the platinum group, nickel (Ni) and copper (Cu); and
   a ferromagnetic thin film deposited on said base layer, said ferromagnetic thin film being composed mainly of an iron carbide and having a preferentially oriented easy magnetization axis and wherein said ferromagnetic thin film comprises at least one member selected from the group consisting of $Fe_3C_2$, $Fe_5C_2$ and $Fe_2C$ and wherein said ferromagnetic thin film has a columnar structure with a minimum of 2000 Å of columnar diameter or a lumpy structure.

4. A magnetic recording medium as set forth in claim 3, wherein said element in IVA group through VIIA group is selected from the group consisting of titanium (Ti) tantalum (Ta), chromium (Cr), tungsten (W) and rhenium (Re).

5. A magnetic recording medium as set forth in claim 3, wherein said element of the platinum group is ruthenium (Ru) or platinum (Pt).

* * * * *

UNITED STATES PATENT AND TRADEMARK OFFICE
CERTIFICATE OF CORRECTION

PATENT NO. : 5,006,395
DATED : April 9, 1991
INVENTOR(S) : Tohru HORI, Tomi SATO, Hideaki KOMODA and Kenichi FUJII It is certified that error appears in the above-identified patent and that said Letters Patent is hereby corrected as shown below:

Title page, under "[22] Filed:    May 11, 1988", insert the following:

-- [30]     Foreign Application Priority Data

May 12, 1987 [JP]    Japan ............... 62-115050
    May 29, 1987 [JP]    Japan ............... 62-135200 --

Signed and Sealed this

Second Day of March, 1993

Attest:

STEPHEN G. KUNIN

*Attesting Officer*    *Acting Commissioner of Patents and Trademarks*